A. MARTI AND A. OESCH.

TOOL HOLDER.

APPLICATION FILED APR. 25, 1919.

Reissued June 10, 1919.

14,664.

Inventors

Alfred Marti and

Alfred Oesch

By

R. L. [illegible]

Attorney

THE NORRIS PETERS CO., PHOTO-LITHO., WASHINGTON, D. C.

UNITED STATES PATENT OFFICE.

ALFRED MARTI AND ALFRED OESCH, OF ERIE, PENNSYLVANIA.

TOOL-HOLDER.

14,664. Specification of Reissued Letters Patent. Reissued June 10, 1919.

Original No. 1,287,068, dated December 10, 1918, Serial No. 219,086, filed February 25, 1918. Application for reissue filed April 25, 1919. Serial No. 292,745.

*To all whom it may concern:*

Be it known that we, ALFRED MARTI and ALFRED OESCH, citizens of Switzerland, having declared our intentions of becoming citizens of the United States, residing at Erie, in the county of Erie and State of Pennsylvania, have invented new and useful Improvements in Tool-Holders, of which the following is a specification.

This invention relates to tool holders and consists in certain improvements in the construction thereof as will be hereinafter fully described and pointed out in the claims.

More particularly the invention relates to tool holders in which the holding socket is concentric with the outer surface of the tool, the tool usually secured by such a holder being a drill.

The invention is illustrated in the accompanying drawings as follows:—

Figure 1:
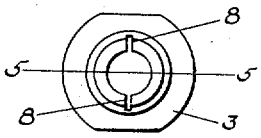

Figure 1 is a top view of the holder.

Figure 2:
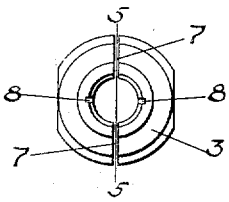

Fig. 2 a bottom elevation of the holder.

Figure 3:
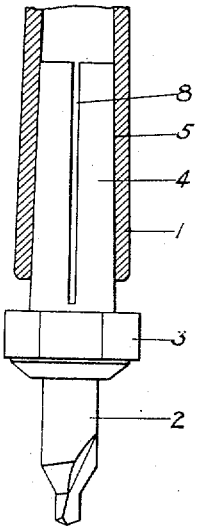

Fig. 3 a side elevation of the holder.

Figure 4:
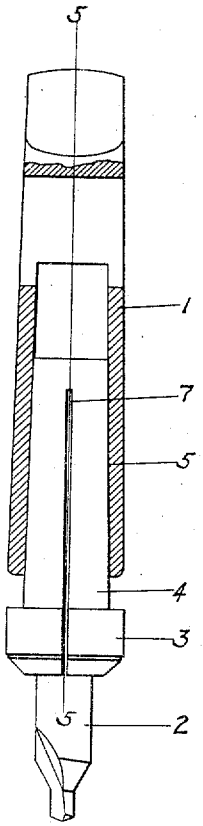

Fig. 4 a side elevation at right angles to that shown in Fig. 3.

Figure 5:
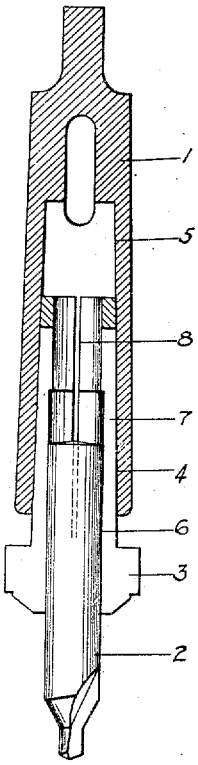

Fig. 5 a section on the line 5—5 in Figs. 1, 2 and 4.

1 marks the drill sleeve, 2 a drill and 3 the tool holder.

The tool holder is formed with a contractible wall, the outer surface 4 of which is tapered to conform to the taper 5 of the sleeve 1. It is provided with a tool-holding socket 6 of a size and shape to receive the drill 2. As shown this socket is cylindrical but in any case the opening or part of the opening centering the drill should be round.

The walls of the holder have the slits 7 which extend into the tool holder from the bottom and nearly through the walls at the upper end of the holder. Preferably there are two of these slits diametrically opposite each other so that both may form a single cut. Slits 8 extend into the wall of the tool holder from the top of the holder and extend nearly through to the bottom of the holder. Preferably there are two of these slits diametrically opposed and these slits overlap the slits 7 being preferably in a plane at right angles to the plane containing the slits 7.

The tool holder is formed of resilient material and the socket 6 is of such a size as to permit of the ready insertion of the drill 2. With the drill in place the holder is forced into the sleeve 1 and this contracts the wall of the holder, thus firmly securing the drill 2. By overlapping the slits and alternating them from opposite ends quite a contraction can be effected without any great flexure of the walls of the holder. Further the symmetrical arrangement of the slits assures the maintenance of the concentric relation between the socket 6 and the taper surface 4 so that the tool is maintained in a central position.

What we claim as new is:—

1. In a tool holder, the combination of a drill sleeve having a tapered socket therein; and a resilient contractible tool holder having its outer wall tapered to conform to the taper of the socket in the sleeve and containing a cylindrical opening concentric with its outer wall for receiving a drill shank, said holder extending when in place in the drill sleeve out of the socket to permit of grasping the holder to force it into place and having overlapping slits extending longitudinally into the walls thereof from opposite ends to permit a concentric contraction of the walls of the holder under pressure of the walls of the socket to engage an inserted drill.

2. In a tool holder, the combination of a drill sleeve having a tapered socket therein; and a resilient contractible tool holder having its outer wall tapered to conform to the taper of the socket in the sleeve and containing a round opening concentric with its outer wall for receiving a drill shank, said holder extending when in place in the drill sleeve out of the socket to permit of grasping the holder to force it into place and having overlapping slits extending longitudinally into the walls thereof from opposite ends to permit a concentric contraction of the walls of the holder under pressure of the walls of the socket to engage an inserted drill.

In testimony whereof we have hereunto set our hands.

ALFRED MARTI.
ALFRED OESCH.

Copies of this patent may be obtained for five cents each, by addressing the "Commissioner of Patents, Washington, D. C."